United States Patent [19]

Shirota et al.

[11] Patent Number: 5,123,960
[45] Date of Patent: Jun. 23, 1992

[54] INK AND INK JET RECORDING METHOD EMPLOYING THE SAME

[75] Inventors: Katsuhiro Shirota, Kawasaki; Tsuyoshi Eida, Yokohama; Takao Yamamoto, Isehara; Mayumi Yamamoto, Nihonbashi, all of Japan

[73] Assignee: Canon Kabushiki Kaisha, Tokyo, Japan

[21] Appl. No.: 584,895

[22] Filed: Sep. 18, 1990

[30] Foreign Application Priority Data

Sep. 19, 1989 [JP] Japan .................................. 1-240749
Jul. 20, 1990 [JP] Japan .................................. 2-192533

[51] Int. Cl.⁵ .............................................. C09D 11/00
[52] U.S. Cl. ........................................ 106/22; 106/20
[58] Field of Search ...................... 106/22, 23; 430/76; 560/205; 540/126

[56] References Cited

U.S. PATENT DOCUMENTS

| | | | |
|---|---|---|---|
| 4,585,484 | 4/1986 | Haruta et al. | 106/22 |
| 4,599,112 | 7/1986 | Yokoyama et al. | 106/22 |
| 4,632,703 | 12/1986 | Koike et al. | 106/22 |
| 4,735,657 | 4/1988 | Baxter et al. | |
| 4,864,324 | 9/1989 | Shirota et al. | 346/1.1 |

FOREIGN PATENT DOCUMENTS

2905654 2/1978 Fed. Rep. of Germany.

OTHER PUBLICATIONS

Kawashita et al., P. I. JP 61002772 A2 8 Jan. 1986 Showa. Ink Comp.
Patent Abstracts of Japan, vol. 10, No. 67 (C-333) (2124) Mar. 15, 1986, with respect to JP-A-60 208365 Oct. 19, 1985).

*Primary Examiner*—William R. Dixon Jr.
*Assistant Examiner*—Margaret V. Einsmann
*Attorney, Agent, or Firm*—Fitzpatrick, Cella, Harper and Scinto

[57] ABSTRACT

An ink in which a dye and a liquid carrier medium are present. The ink includes a dye comprising a compound represented by the following general formula (I):

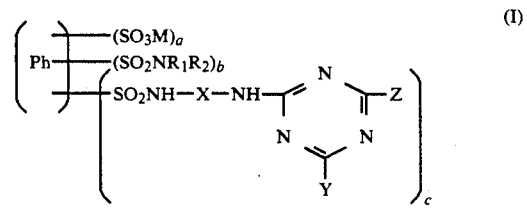

wherein Ph is a copper or nickel phthalocyanine residue, M is an alkali metal or ammonium, $R_1$ and $R_2$ are each H, $-(CH_2CH_2O)_m-R_3$ or $-(CH_2CHOH)_m-R_3$ in which $R_3$ is H, $CH_3$, $C_2H_5$ or $CH_2OH$ and in which m is a number from 0 to 4, a is a number from 0 to 2, X is a lower alkylene or phenylene group, C is a number from 2 to 3, and b is a number from 0 to 2 with the proviso that when b is 0, then Y and Z are respectively Cl, OH or $OR_4$ is an alkyl group having 1 or 2 carbons or a hydroxyalkyl group, and when b is not 0, then Y is Cl, $NR_5R_6$ or $OR_7$ and Z is $NR_5R_6$, $OR_7$, a substituted or unsubstituted anilino group or a substituted or unsubstituted phenoxy group, wherein $R_5$ and $R_6$ are respectively H, an alkyl group, an alkylalkoxy group or a hydroxyalkyl group and have 4 or less carbons in total and, wherein $R_7$ is H, an alkyl group having 1 to 3 carbons or a substituted or unsubstituted phenyl group.

20 Claims, 3 Drawing Sheets

INK AND INK JET RECORDING METHOD EMPLOYING THE SAME

BACKGROUND OF THE INVENTION

1. Field of the Invention

The present invention relates to an ink, and more particularly, to an ink jet recording ink. The present invention pertains to a water based ink capable of providing blue images with improved indoor discoloration, and an ink jet recording method employing such a ink.

2. Description of the Related Art

Conventionally, water based inks of the type in which a water soluble dye is dissolved in a water carrier medium have been used as inks for fountain pens and felt pens and as inks for use in the ink jet recording. A water soluble organic solvent is generally added to such water based inks in order to prevent clogging of a pen point or an ink ejecting nozzle.

The conventional inks are required to provide images having a sufficient density, not to cause clogging of a pen point or a nozzle, to dry quickly when placed on a recorded material, to bleed less, to exhibit excellent storage particularly when it is used in the ink jet process which utilizes heat energy, and to provide images which exhibit excellent light fastness and water fastness.

Among the above requirements of the conventional inks, durability of the images formed by them is particularly important.

Conventionally, durability of the images has been mainly brought into question in the form of color fading of the images caused by the direct sunshine or various types of light, and this problem involving the color fading has been solved by the selection of dyes which exhibit excellent light fastness. For example, C.I. Direct Blue 86, whose skeleton is composed of phthalocyanine, has been conventionally employed as the dye for blue inks.

However, in addition to the color fading caused by high illumination, color fading of the images caused in an indoor environment has been drawing attention in recent years.

This type of color fading occurs in an indoor environment which is not reached by direct sunshine, and certain types of recorded materials on which images are formed accelerate this color fading. The use of the widely used C.I. Direct Blue 86 cannot solve this problem.

Particularly, these types of color fading occur to a great extent with the so-called coated paper on which an ink accepting layer composed of a pigment and a binder is formed on a substrate such as paper to enhance coloring and vividness of the ink and to improve image quality, such as definition. Selection of dyes exhibiting excellent light fastness alone is not enough to solve this problem.

SUMMARY OF THE INVENTION

An object of the present invention is to provide a cyan ink which is capable of solving the drawbacks of the conventional techniques, which therefore exhibits excellent storage stability and clogging resistance and which does not readily generate color fading on a coated sheet of paper.

Another object of the present invention is to provide a cyan ink capable of providing images which do not readily fade and which have a high density.

Another object of the present invention is to provide an ink jet recording method which exhibits excellent clogging resistance and which does not readily generate color fading.

In order to achieve these objects, the present invention provides an ink in which a dye and a liquid carrier medium are present. The dye comprises a compound represented by the following general formula (I):

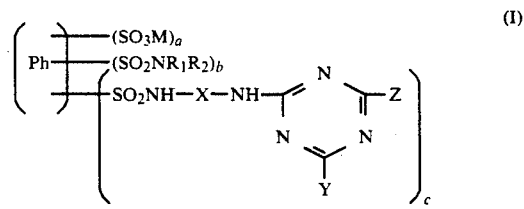

wherein Ph is a copper or nickel phthalocyanine residue, M is an alkali metal or ammonium, $R_1$ and $R_2$ are each H, $-(CH_2CH_2O)_m-R_3$ or $-(CH_2CHOH)_m-R_3$ in which $R_3$ is H, $CH_3$, $C_2H_5$ or $CH_2OH$ and in which m is a number from 0 to 4, a is a number from 0 to 2, X is a lower alkylene or phenylene group, C is a number from 2 to 3 and b is a number from 0 to 2 with the proviso that when b is 0, then Y and Z are respectively Cl, OH or $OR_4$ wherein $R_4$ is an alkyl group having 1 or 2 carbons or a hydroxylakyl group, and when b is not 0, then Y is Cl, $NR_5R_6$ or $OR_7$ and Z is $NR_5R_6$, $OR_7$, a substituted or unsubstituted anilino group or a substituted or unsubstituted phenoxy group, wherein $R_5$ and $R_6$ are respectively H, an alkyl group, an alkylalkoxy group or a hydroxyalkyl group and have 4 or less carbons in total and, wherein $R_7$ is H, an alkyl group having 1 to 3 carbons or a substituted or unsubstituted phenyl group.

The present invention further provides an ink in which a dye and a liquid carrier medium are present. The dye comprises a compound represented by the following general formula (II):

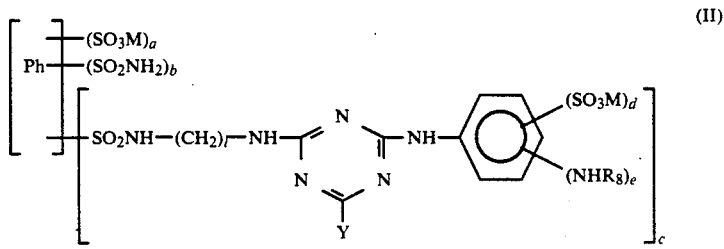

wherein Ph is a copper or nickel phthalocyanine residue, M is an alkali metal or ammonium, Y is Cl, $NR_5R_6$ or $OR_7$, $R_8$ is a substituted or unsubstituted triazine ring or a substituted or unsubstituted propionyl group, a is a number from 0 to 2, b is a number from 1 to 2, c is a number from 2 to 3, d is a number from 1 to 2, e is a number from 0 to 1, and l is a number from 1 to 3.

The present invention further provides an ink in which a dye and a liquid carrier medium are present. The dye comprises a mixture of a compound expressed by the following general formula (I) and C.I. Direct Blue 86 or C.I. Direct Blue 199 whose mixture ratio ranges from 1:1 to 3:1:

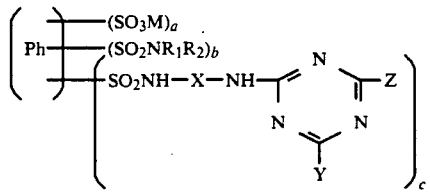

wherein Ph, M, $R_1$, $R_2$, $R_3$, m, a, b, X, Y, Z, $R_4$, $R_5$, $R_6$, $R_7$ and c are as above.

The present invention further provides an ink in which a dye and a liquid carrier medium are present. The dye comprises a mixture of a compound expressed by the following general formula (II) and C.I. Direct Blue 86 or C.I. Direct Blue 199 whose mixture ratio ranges from 1:1 to 3:1:

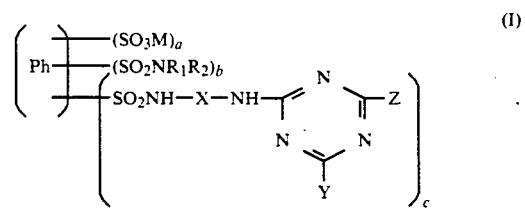

wherein Ph, M, $R_1$, $R_2$, $R_3$, m, a, b, X, Y, Z, $R_4$, $R_5$, $R_6$, $R_7$ and c are as above. In the general formula (I), Z may be a substituted anilino group or a substituted phenoxy group, and $R_7$ may be a substituted phenyl group. Examples of such substituted groups include an alkyl group, a hydroxyl group, a halogen group, a sulfonic group, carboxyl group, an alkoxy group, an amino group, a hydroxyalkylamino group, and phenyl group. Among these groups, a hydroxyl group, a sulfonic group, a carboxyl group, an amino group and a hydroxyalkylamino group are preferred.

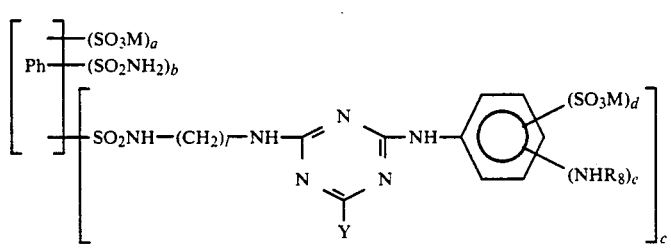

wherein Ph, M, Y, $R_8$, a, b, c, d, e, and l are as above.

Figure 3:
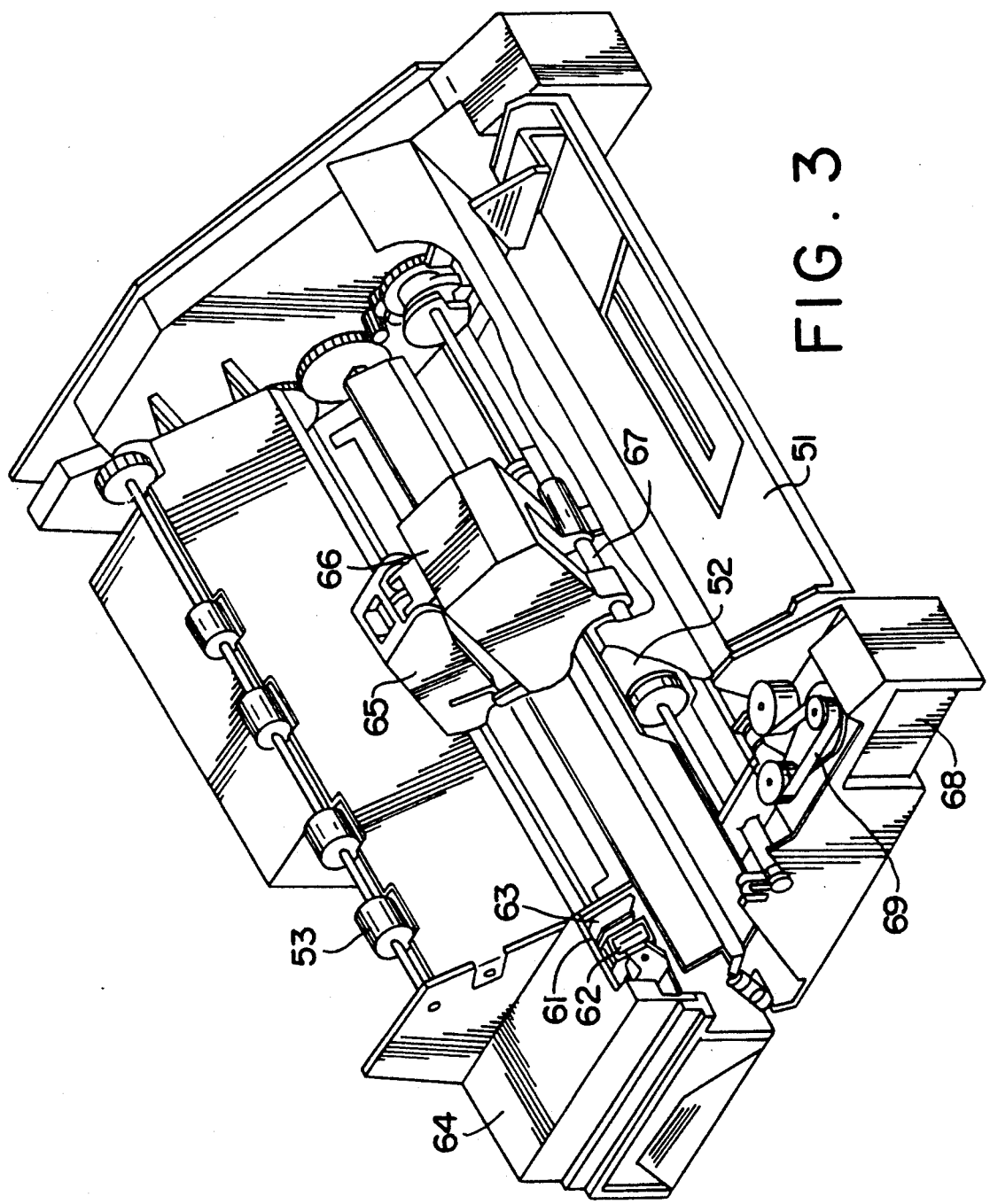
Figure 4:
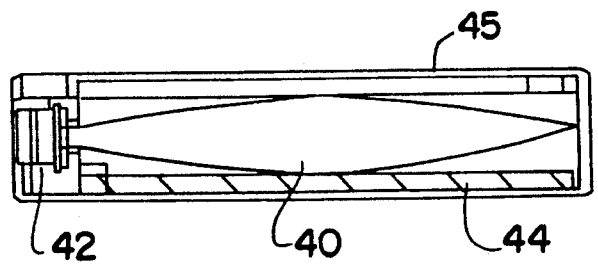

The present invention further provides an ink jet recording method in which a droplet of ink is ejected from an orifice onto a recording material in accordance with a recording signal for recording. The ink is composed of a dye and a liquid carrier medium. The dye comprises a compound expressed by the following general formula (I):

FIG. 3 is a perspective view of an example of an ink jet recording apparatus;

FIG. 4 is a longitudinal cross-sectional view of an ink cartridge; and

Figure 5:
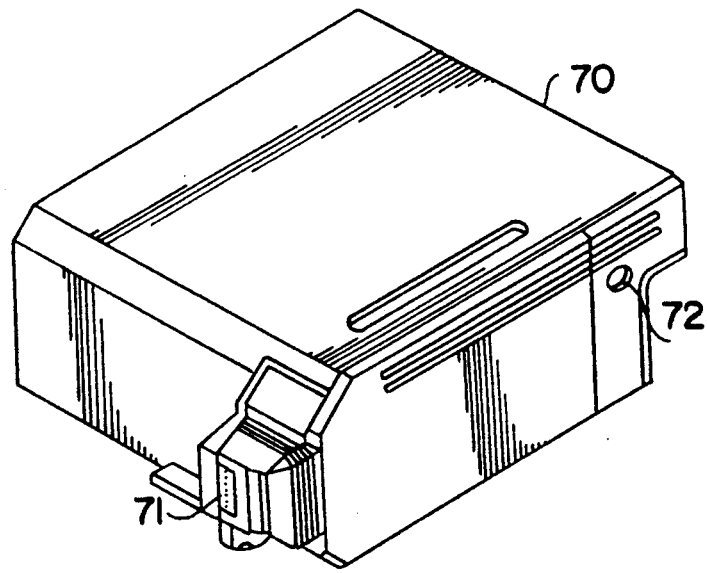

FIG. 5 is a perspective view of an ink jet cartridge.

DETAILED DESCRIPTION OF THE INVENTION

According to the present invention, since the above-described dye is used as a cyan dye, it is possible to provide a cyan ink capable of providing images whose color fades less in an indoor environment on a coated sheet of paper.

The present invention will be further described in detail by way of examples.

Although any dye included in the general formula (I) can be employed as the dye expressed by the general formula (I), the following dyes No. 1 to 31 are preferred:

No. 1 Central metal: Cu or Ni

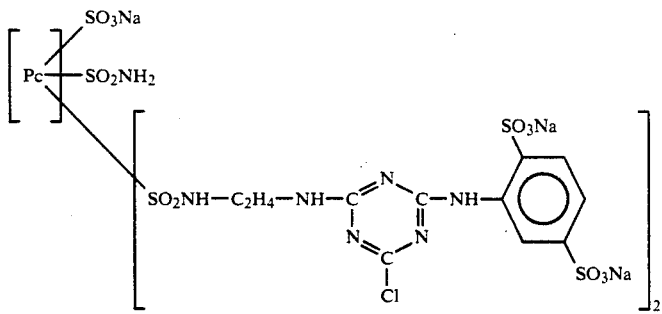
No. 2 Central metal: Cu or Ni
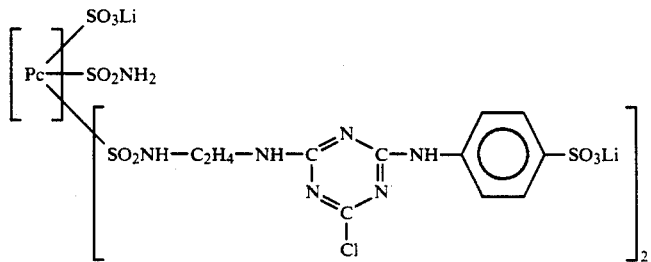
No. 3 Central metal: Cu or Ni
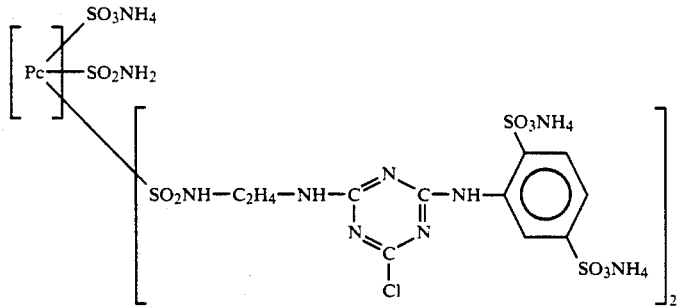
No. 4 Central metal: Cu or Ni
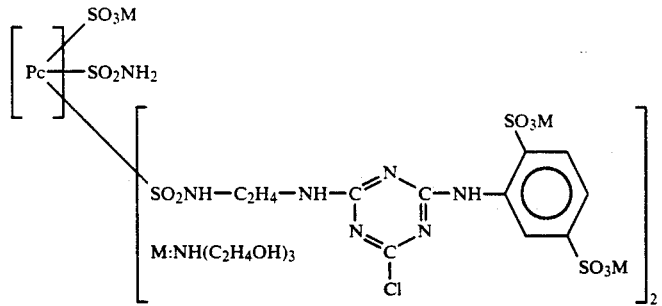
No. 5 Central metal: Cu or Ni
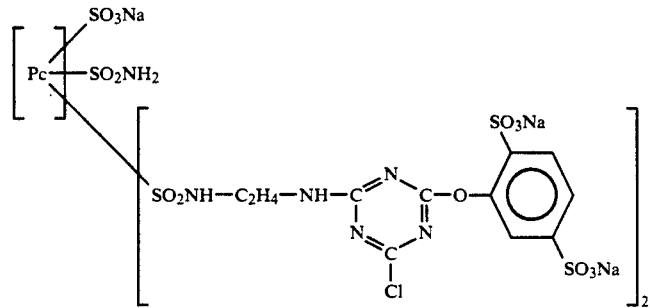
No. 6 Central metal: Cu or Ni -continued
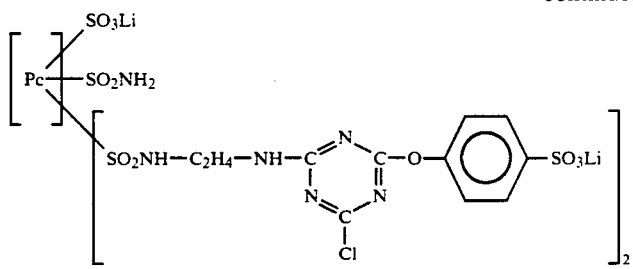
No. 7 Central metal: Cu or Ni
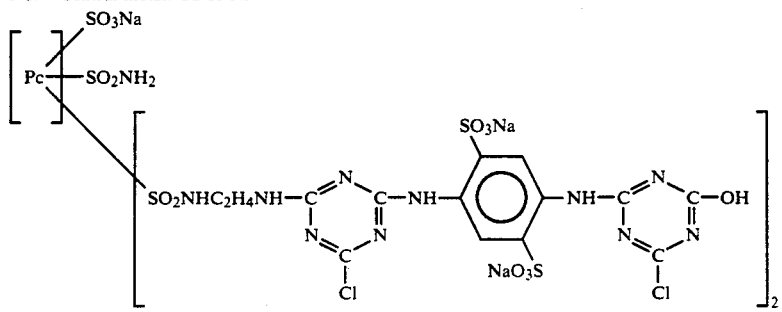
No. 8 Central metal: Cu or Ni
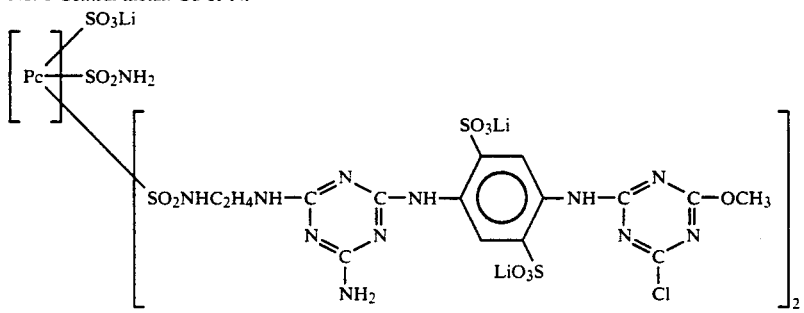
No. 9 Central metal: Cu or Ni
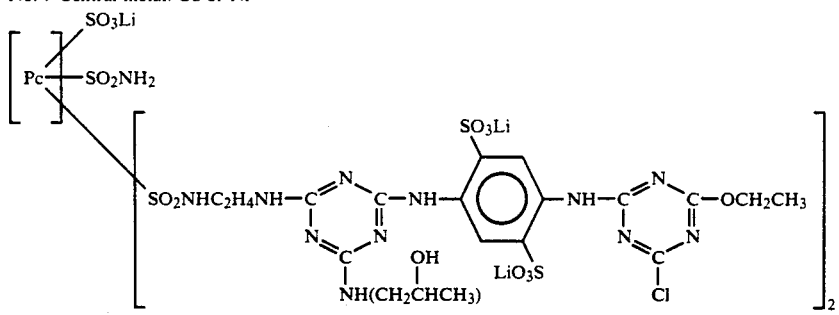
No. 10 Central metal: Cu or Ni
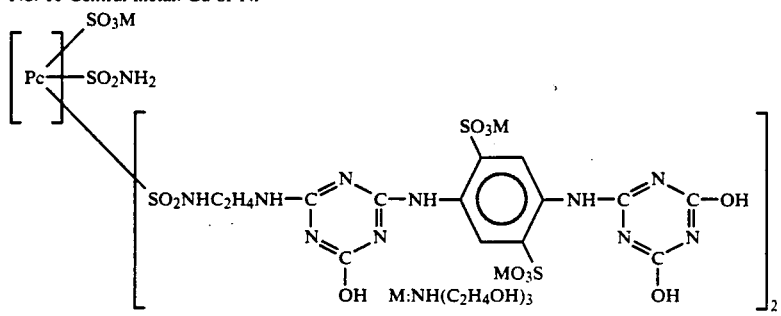
No. 11 Central metal: Cu or Ni

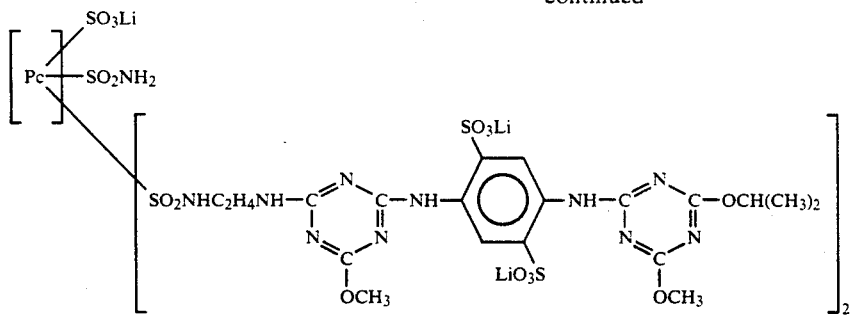
No. 12 Central metal: Cu or Ni
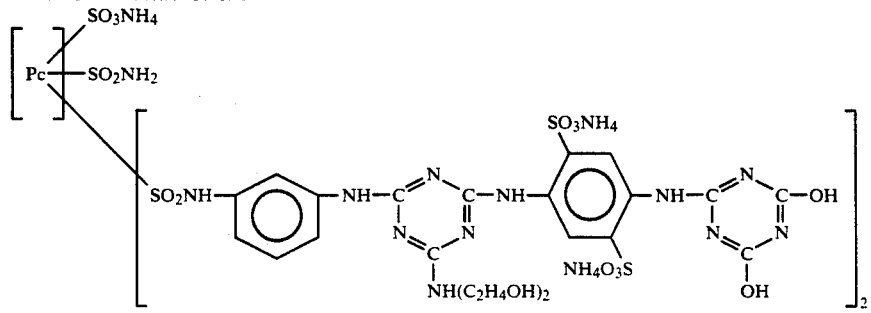
No. 13 Central metal: Cu or Ni
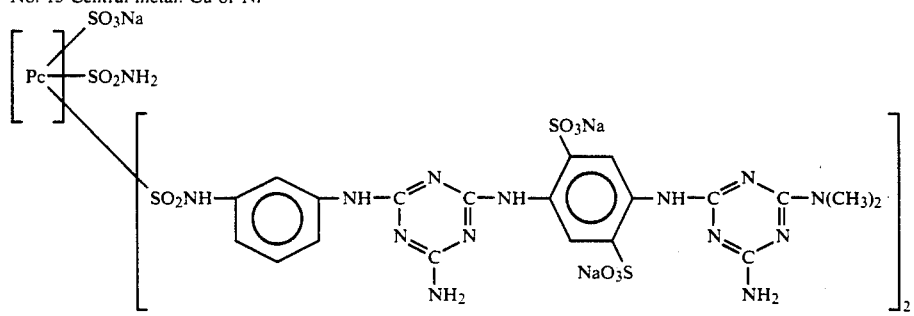
No. 14 Central metal: Cu or Ni
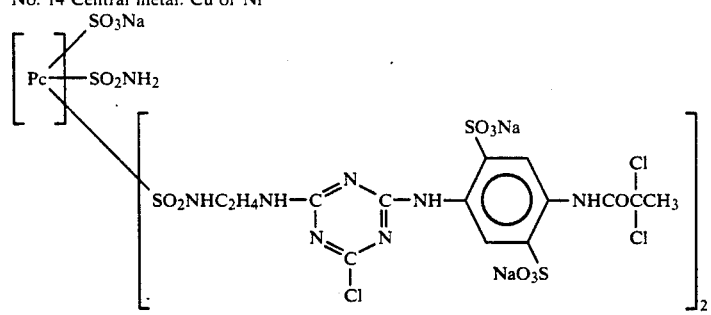
No. 15 Central metal: Cu or Ni
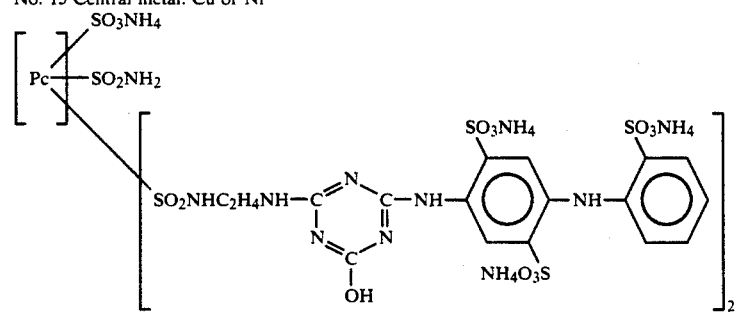
No. 16 Central metal: Cu or Ni

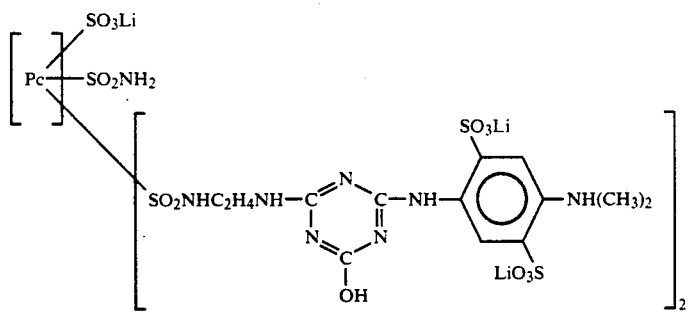
No. 17 Central metal: Cu or Ni
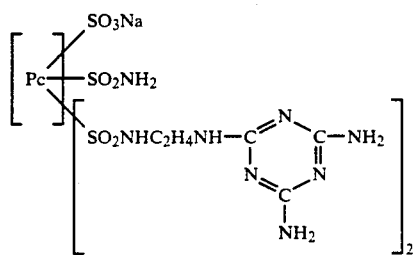
No. 18 Central metal: Cu or Ni
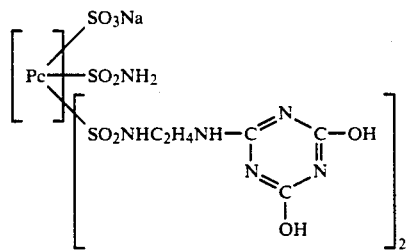
No. 19 Central metal: Cu or Ni
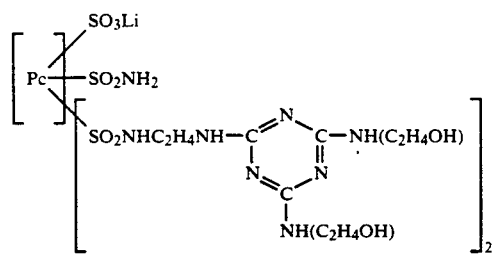
No. 20 Central metal: Cu or Ni
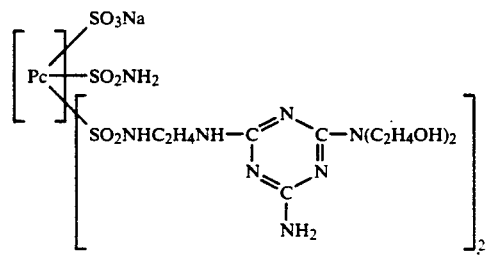
No. 21 Central metal: Cu or Ni -continued
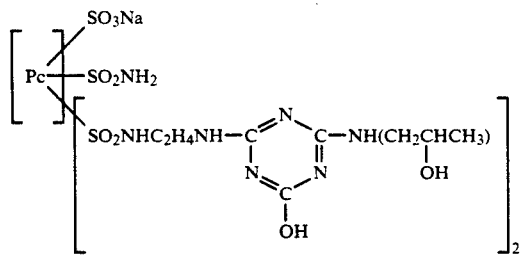
No. 22 Central metal: Cu or Ni
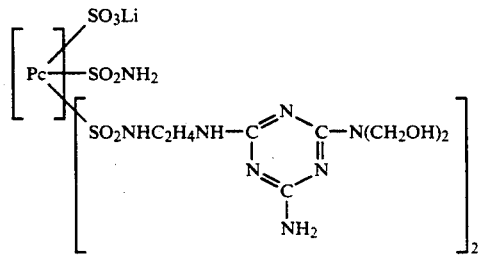
No. 23 Central metal: Cu or Ni
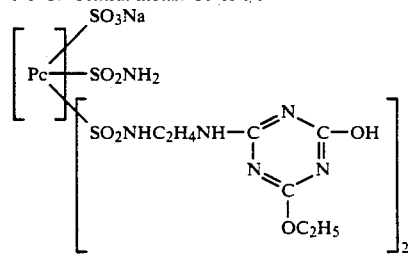
No. 24 Central metal: Cu or Ni
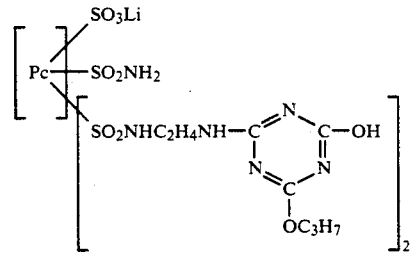
No. 25 Central metal: Cu or Ni
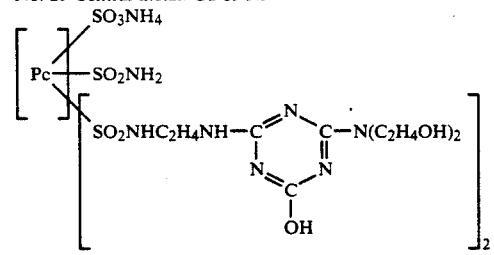
No. 26 Central metal: Cu or Ni
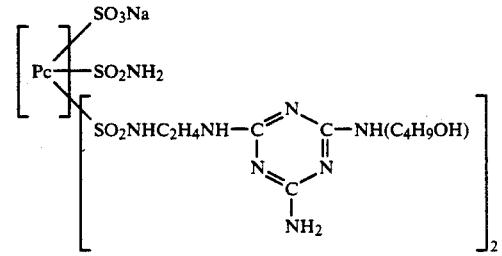

-continued
No. 27 Central metal: Cu or Ni
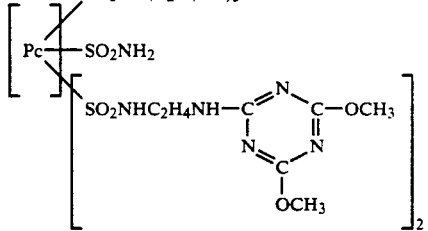
No. 28 Central metal: Cu or Ni
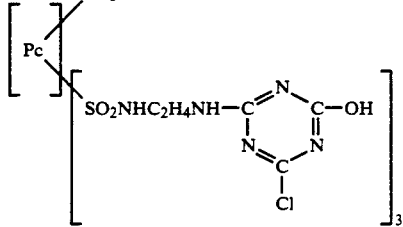
No. 29 Central metal: Cu or Ni
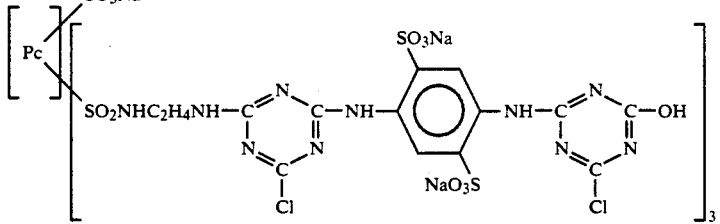
No. 30 Central metal: Cu or Ni
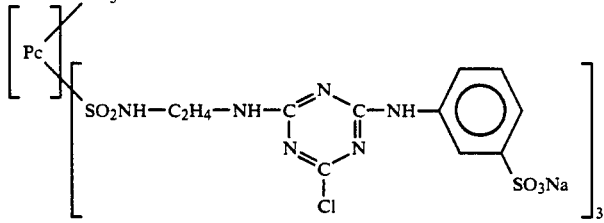
No. 31 Central metal: Cu or Ni
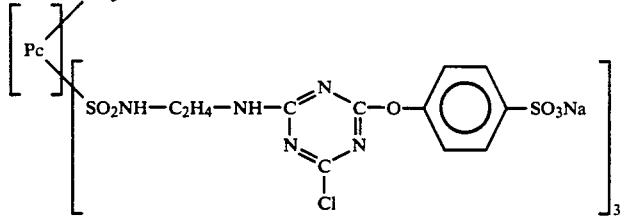
No. 32 Central metal: Cu or Ni
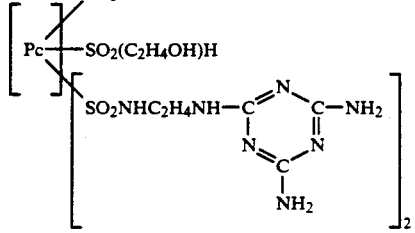
No. 33 Central metal: Cu or Ni

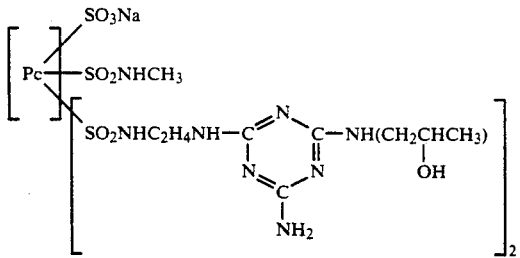

No. 34 Central metal: Cu or Ni

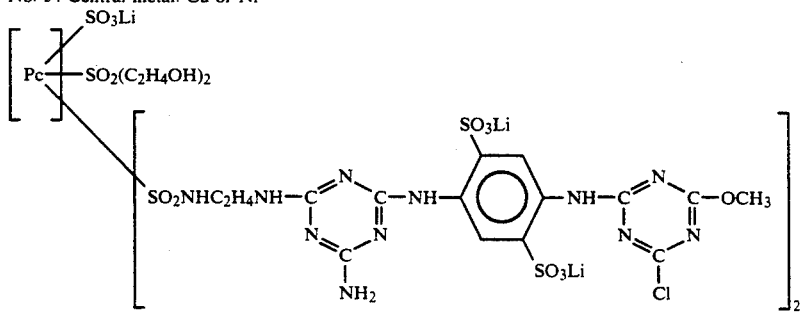

No. 35 Central metal: Cu or Ni

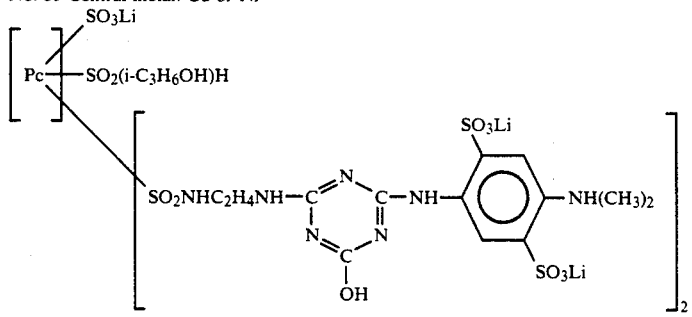

No. 36 Central metal: Cu or Ni

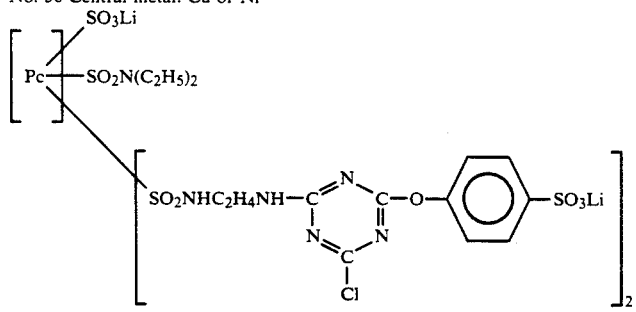

Among the above dyes, the dyes expressed by the general formula (II), such as dyes No. 1 to 11 and No. 14, are particularly preferred from the viewpoint of color fastness:

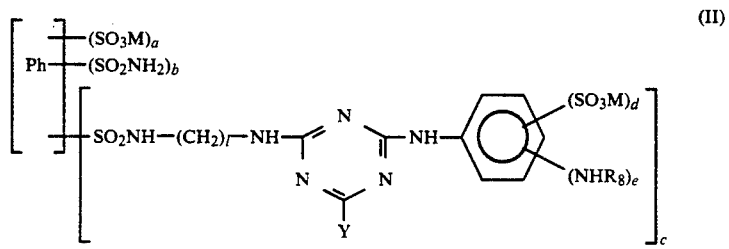

wherein Ph, M, Y, $R_8$, a, b, c, d, e, and l are as above.

The cyan dye employed in the present invention may be a salt produced by the interaction of sodium and a water soluble group, such as a sulfonic group, or a salt produced by the interaction of a water-soluble group and potassium, lithium, ammonia or an organic amine.

Since the dye expressed by the general formula (I) has a bulky substituent group in which a phthalocyanine skeleton includes a triazine ring, it has a higher molecular weight than the phthalocyanine dye, such as C.I. Direct Blue 86 or C.I. Direct Blue 199.

Hence, to achieve the same level of color density as that obtained when C.I. Direct Blue 86 or C.I. Direct Blue 199 is used, the dye concentration must be increased. However, this increases the viscosity of the ink, thus increasing the possibility that clogging may occur due to the ink remaining in the nozzles of the ink jet head. This may in turn cause cessation of ejection of the ink and a shift in the position that the ink droplet reaches when printing is restarted, which may lead to faint printing or broken printing.

It is therefore preferable for the color density to be increased by using other cyan dyes together with the above cyan dye of the present invention.

Any water soluble dye which exhibits excellent coloring, which does not reduce light fastness of a resultant ink when used together with the dye according to the present invention, and which does not chemically react with the dye according to the present invention, such as an acid dye, a substantive dye or a reactive dye, can be employed together with the dye according to the present invention. Suitable examples include C.I. Direct Blue 86, 87, 199, C.I. Acid Blue 185, C.I. Reactive Blue 25, 41, 71, 116, 118, 228.

Among the above examples, C.I. Direct Blue 86 and 199 are particularly preferred from the viewpoints of the light fastness, the dissolved property and the coloring property.

The preferred weight ratio of the dye according to formula (I) of the present invention to the above noted other water soluble dye ranges between 1:1 and 3:1 with the most preferred range of weight ratios between 1:1 and 2:1.

Although there is no limitation to the proportion of the dye in the ink according to the present invention, the preferred proportion is 0.1 to 20 wt %, with more preferred proportion being 0.3 to 10 wt %, and with the most preferred ink having about 0.5 to 6 wt % of dye based on the total weight of the ink. Unless otherwise indicated all weight percents are based on the total weight of ink.

The carrier medium used in the ink of the present invention is preferably water or a mixed solvent of water and a water soluble organic solvent and, more preferably, a mixed solvent of a deionized water which does not contain various ions and a water soluble organic solvent which contains a polyatomic alcohol capable of preventing drying of the ink.

Suitable examples of the water soluble organic solvents that can be mixed with water include: an alkyl alcohol having 1 to 5 carbons, such as methyl alcohol, ethyl alcohol, n-propyl alcohol, isopropyl alcohol, n-butyl alcohol, sec-butyl alcohol, tert-butyl alcohol, isobutyl alcohol or n-pentanol; an amide, such as dimethyl formaldehyde or dimethyl acetoamide; a ketone or a ketoalcohol, such as acetone or diacetone alcohol; an ether, such as tetrahydrofuran or dioxane; a polyalkylene glycol, such as polyethylene glycol or polypropylene glycol; an alkylene glycol whose alkylene group includes 2 to 6 carbons, such as ethylene glycol, propylene glycol, butylene glycol, triethylene glycol, 1, 2, 6-hexanetriol, thiodiglycol, hexylene glycol or diethylene glycol; a lower alkyl ether of a polyhydric alcohol, such as glycerine, ethyleneglycol monomethyl (or ethyl) ether, diethyleneglycol monomethyl (or ethyl) ether or triethyleneglycol monomethyl (or ethyl) ether; a lower dialkyl ether of a polyhydric alcohol, such as triethyleneglycol dimethyl (or ethyl) ether or tetraethyleneglycol dimethyl (or ethyl) ether; sulforan, N-methyl-2-pyrolidone and 1, 3-dimethyl-2-imidazolidinone.

A suitable organic solvent is selected from among the above-described ones. In order to prevent clogging of the ink, glycerine or a polyethylene oxide having 3 to 6 repeating units is preferably employed. From the viewpoints of the image density and the ejection stability, a nitrogen ring compound or an ether compound of polyalkylene oxide is preferred. The use of a lower alcohol or a surface active agent improves the frequency response of the ink. Thus, the solvent that can be used in the present invention has a composition consisting of water and at least one of the above-described compounds.

The preferred weight proportion of the water soluble organic solvent in the ink according to the present invention is between 2 to 80 wt % with a more preferred weight being between 3 to 70 wt % and with the most preferred one being between 4 to 40 wt %.

The preferred composition proportion of water in the ink is 35 wt % or above, with a more preferred one being from 45 wt % to 95 wt %. If the amount of water is less, a large amount of organic solvent having a low volatility remains in the image formed by the resultant ink. This may cause migration of the dye or bleeding of the image and is therefore undesirable.

When necessary, a mildew-proofing agent, an antiseptic agent, a pH-adjuster, a viscosity adjuster or a surface tension adjuster may also be added to the ink of the present invention.

Suitable examples of the pH adjuster that can be employed in the ink of the present invention include an organic amine, such as diethanol amine or triethanol amine, an inorganic alkaline agent of hydroxide of an alkali metal, such as sodium hydroxide, lithium hydroxide or potassium hydroxide, an organic acid salt, such as lithium acetate, an organic acid and an inorganic acid.

The preferred viscosity of the ink of the present invention is 1 to 20 cP at 25° C., and more preferably 1 to 15 cP. The preferred surface tension of the ink according to the present invention is 30 dyne/cm or above, more preferably 40 dyne/cm or above. The preferred pH of the ink according to the present invention is 4 to 10.

The recording method of the present invention is characterized by the use of the above-described ink. Although any recording method and any recording material can be employed in the recording method according to the present invention, the ink jet method and the coated sheet of paper are preferably used.

The recording liquid according to the present invention is particularly suitable for use in the ink jet recording method in which recording is performed by ejecting a droplet of ink due to the action of heat energy. However, it may also be used as an ink for general writing pens.

The ink according to the present invention is suitably used in a recording apparatus of the type in which a droplet of ink is ejected due to the thermal energy given to the recording liquid accommodated in a recording head in accordance with a recording signal.

Figure 1A:
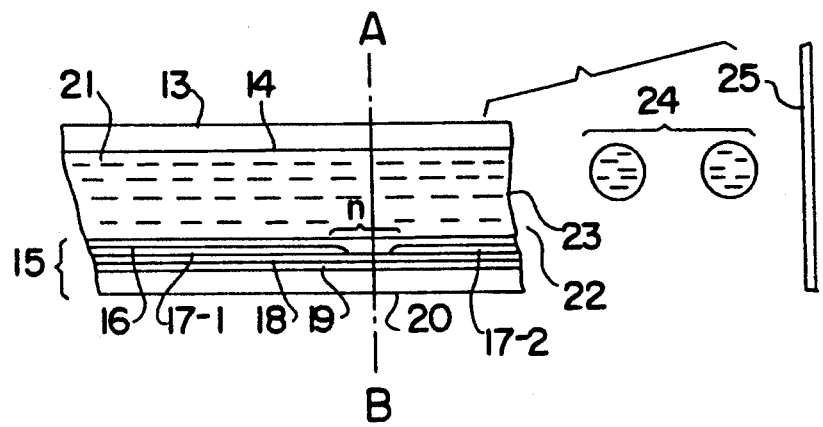
FIGS. 1 (a) and 1 (b) are respectively longitudinal and lateral cross-sectional views of a heat portion of an ink jet recording apparatus.
Figure 1B:
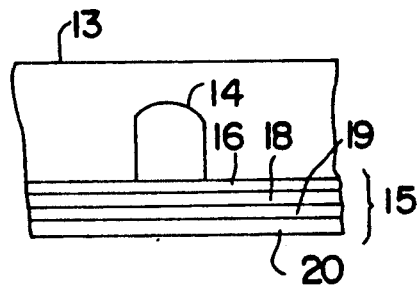
Figure 2:
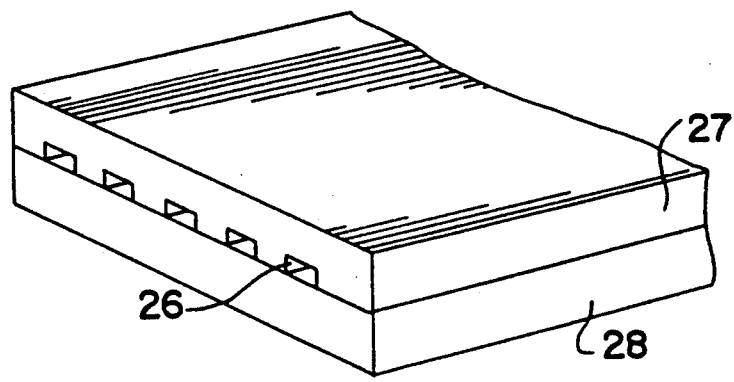
FIG. 2 is an perspective view of a multi-head in which a plurality of heads of FIG. 1 are incorporated.

FIGS. 1 (a) and 1 (b) and FIG. 2 show an example of a head of such a recording apparatus.

A head 13 includes a glass, ceramic or plastic plate having a groove 14 through which an ink passes, and a heating head 15 which is employed for the thermal recording and which is adhered to the plate. A thin film head is shown in the figures. However, the structure of the heating head 15 is not limited to this embodiment. The heating head 15 has a protective film 16 made of silicone oxide, aluminum electrodes 17-1 and 17-2, a heating resistor layer 18 formed of nichrome or the like, a heat accumulating layer 19, and a substrate 20 formed of a material, such as alumina, which exhibits excellent heat radiation.

An ink 21 is provided in an orifice (fine hole) 22. A meniscus 23 is formed in the orifice 22 due to a pressure P.

When an electrical signal is applied to the electrodes 17-1 and 17-2, an area of the heating head 15 which is indicated by n is heated rapidly, generating a bubble in the ink 21 which is in contact with the area n. This bubble applies its pressure to the meniscus 23 and thereby causes it to protrude. As a result, the ink 21 is ejected from the orifice 22 toward a recording body 25 in the form of recording droplets 24. FIG. 2 shows the external view of a multi-head in which a large number of heads, shown in FIG. 1 (a), are aligned. The multi-head includes a glass plate 27 having multi-grooves 26, and a heating head 28 which consists of the large number of heads shown in FIG. 1 (a) and which is adhered to the glass plate 27.

FIG. 1 (a) is a longitudinal cross-sectional view of a head 13 taken along the ink flow passage, and FIG. 1 (b) is a section taken along the line A-B of FIG. 1 (a).

FIG. 3 shows an example of an ink jet recording apparatus which incorporates the multi-head shown in FIG. 2.

In FIG. 3, a blade 61 is a wiping member whose one end is fixed by a blade retaining member. This makes the blade 61 form a cantilever. The blade 61 is disposed adjacent to a recording area in which recording is performed by a recording head, and is retained in the case of this example in such a manner that it protrudes into the path along which the recording head moves. A cap 62 is disposed at a home position disposed adjacent to the blade 61. The cap 62 is capable of moving in the direction perpendicular to the direction in which the recording head moves and thereby making contact with the discharge port surface of the recording head to cap it. An ink absorber 63 is disposed adjacent to the blade 61 and is retained, like the blade 61, in such a manner that it protrudes into the path along which the recording head moves. The blade 61, the cap 62 and the ink absorber 63 in combination form a head recovering unit 64. The water contents and dust attached to the ink discharge port surface of the recording head are removed by the blade 61 and the ink absorber 63.

A recording head 65 has a discharge energy generating means and performs recording by ejecting an ink onto a recording material disposed opposite to the discharge port surface of the recording head on which discharge ports are provided. A carriage 66 mounts and moves the recording head 65. The carriage 66 is engaged with a guide shaft 67 in such a manner that it can slide therealong. Part of the carriage 66 is connected (not shown) to a belt 69 driven by a motor 68, by which the carriage 66 can move along the guide shaft 67 so as to move the recording head 65 between the recording area and the area adjacent to it.

A recording material, which is inserted from a paper feeding unit 51, is fed to the position where it faces the discharge port surface of the recording head by a paper feeding roller 52 driven by a motor which is not shown. As the recording progresses, the recording material is discharged into a paper discharge unit where paper discharge rollers 53 are provided.

In the thus-arranged ink jet recording apparatus, when the recording head 65 returns to its home position after the recording is completed, the discharge port surface of the recording head 65 is wiped by the blade 61 which is located within the moving path of the recording head. At that time, the cap 62 of the head recovering unit 64 is at a retracted position where it is moved away from the moving path of the recording head 65. When the cap 62 is to be brought into contact with the discharge surface of the recording head 65 to cap it, the cap 62 protrudes into the moving path of the recording head 65.

When the recording head 65 moves from the home position to the recording starting position, the cap 62 and the blade 61 are located at the same positions as those where they are located when the above-described wiping is conducted. In consequence, the discharge port surface of the recording head 65 is wiped also at this time.

The recording head moves back to its home position and the above wiping is performed not only when recording is completed and when the recording head is to be recovered but also at predetermined intervals between the movements of the recording head in the recording area for recording.

FIG. 4 shows an example of an ink cartridge 45 which contains an ink supplied to a head through an ink supply tube. An ink bag 40 contains an ink. The distal end of the ink bag 40 is closed by a plug 42. The ink contained in the ink bag 40 can be supplied to a head by inserting a needle (not shown). Ink waste is received by an ink absorber 44.

The ink jet recording apparatus which can be used in this invention may incorporate the head and the ink cartridge which are separate components, as shown in FIGS. 1a, 1b, 2 and 4, or alternatively incorporate the head and the ink cartridge which are formed as one unit, as shown in FIG. 5.

In FIG. 5, an ink jet cartridge 70 accommodates an ink absorber impregnated with ink. The ink in the ink absorber is ejected from a head unit 71 having a plurality of orifices in the form of a droplet.

The cartridge 70 has an air port 72 through which the interior of the cartridge communicates with the atmosphere.

The ink cartridge 70 shown in FIG. 5 is used in place of the recording head 65 shown in FIG. 3. The ink cartridge 70 is detachably mounted on the carriage 66.

Although any recording material, including a normal sheet of paper, a sheet of wood-free paper, a coated sheet of paper and a plastic film for OHP, can be used as the recording material used in the present invention, the coated paper is particularly preferred.

The coated paper is made up of a substrate made of paper, such as normal paper or wood-free paper, and an ink accepting layer made of a pigment and a binder and adhered to the surface of the substrate. This structure of the coated paper improves coloring and vividness of the ink as well as the dot form.

In the coated paper, a sheet of coated paper made by using a fine pigment, such as synthesized silica, having a BET specific surface area of 35 to 650 m²/g, provides vivid images which exhibit excellent coloring. However, in the case where the conventional inks are used, the images formed on the coated paper by using the blue inks experience color fading which progresses as the time passes by, although the theoretical reason is unknown. Since the higher the ozone concentration in an environment, the higher the degree of color fading, it is considered that color fading may be caused by the decomposition of the dye due to the oxidizing gas, such as SOx, Nox or ozone, contained in the air.

The same problem occurs with a recording material which is made up of a substrate made of paper and a thin layer made of a pigment and a binder which is provided on the paper substrate and which contains fibers of the paper that forms the substrate.

Single color or full color images formed on the above-described types of coated paper using the ink according to the present invention do not experience such color fading.

Hence, according to the present invention, it is possible to provide, on a sheet of coated paper made by using a pigment whose BET specific surface area is between 35 to 650 m²/g, a sheet of coated paper made by using a pigment having a BET specific surface area other than the above stated one, a normal sheet of paper or any type of recording material, images whose color does not fade when they are left indoors for a long period of time.

The recording method which employs the ink jet method and the above-described various types of recording materials are known and have been proposed by the present applicant also. They can be used in this invention without alteration.

EXAMPLES

The present invention will now be described further in detail using examples and comparative examples. All parts hereinafter referred to are in weight terms unless otherwise stated.

(1) Preparation of Ink

Inks according to the present invention, which are listed in Table 2, were prepared by mixing and stirring each composition shown in Table 1 and then by pressure filtering the obtained solution using an ethylene tetrafluoride filter having a pore size of 0.45 μm (manufactured by Sumitomo Denko).

TABLE 1

| No. | Recipe | Amount |
|-----|--------|--------|
| 1 | The dye of general formula (I) | 3 parts |
|   | Glycerine | 15 parts |
|   | Water | 82 parts |
| 2 | The dye of general formula (I) | 3 parts |
|   | Diethylene glycol | 20 parts |
|   | Water | 77 parts |
| 3 | The dye of general formula (I) | 3 parts |
|   | Diethylene glycol | 25 parts |
|   | Ethylene alcohol | 5 parts |
|   | Water | 67 parts |
| 4 | The dye of general formula (I) | 3 parts |
|   | N-methylpyrolidone | 10 parts |
|   | Glycerine | 15 parts |
|   | Water | 72 parts |
| 5 | The dye of general formula (I) | 1.5 parts |
|   | C.I. Direct Blue 86 | 1.5 parts |
|   | Glycerine | 15 parts |
|   | Water | 82 parts |
| 6 | The dye of general formula (I) | 1.8 parts |
|   | C.I. Direct Blue 199 | 1.2 parts |
|   | Diethylene glycol | 20 parts |
|   | Water | 77 parts |
| 7 | The dye of general formula (I) | 2 parts |
|   | C.I. Direct Blue 86 | 1 part |
|   | Diethylene glycol | 25 parts |
|   | Ethylene alcohol | 5 parts |
|   | Water | 67 parts |
| 8 | The dye of general formula (I) | 2 parts |
|   | C.I. Direct Blue 199 | 1 part |
|   | N-methyl-2-pyrolidone | 10 parts |
|   | Glycerine | 15 parts |
|   | Water | 72 parts |

(2) Examples of the Use

Printing was performed on the following recording materials A to C using the ink jet printer BJ 130 (manufactured by Canon) of the type which utilized a heating element as an ink ejection energy source as well as the various inks listed in Table 2. In each printing, occurrence of clogging (a) when printing was started again after it was temporarily suspended, recovery of clogging (b) when printing was started again after it was suspended for a long period of time, the color fastness (c) and the light fastness (d) were determined.

Recording material A: The coated paper for ink jet recording, NM (trademark) manufactured by Mitsubishi Seishi K.K.

Recording material B: The coated paper, PIXEL PRO (trademark), manufactured by Canon Recording material C: The copying paper, Canon PAPER DRY (trademark), manufactured by Canon Hanbai

(3) Method of and Results of Evaluation (a) Occurrence of Clogging When Printing was Restarted after temporary suspension After alphanumeric characters were continuously printed on the recording material C for 10 minutes using the printer charged with a predetermined ink, printing was suspended and the printer was left in an uncapped state for 10 minutes (20° C.±5° C., 50±10% RH). Thereafter, alphanumeric characters were printed again. Occurrence of clogging was determined by the presence of defects in the characters, such as fainting or breakage thereof.

(b) Recovery of Clogging When Printing is Restarted After it is Suspended for a Long Period of Time After alphanumeric characters were continuously printed on the recording material C for 10 minutes using the printer charged with a predetermined ink, printing was suspended and the printer was left in an uncapped state for 7 days (60° C., 10±5% RH). Thereafter, recovery operation of the nozzle clogging was conducted. Recovery from clogging was determined by the number of times the recovery operations were performed by the time normal printing without defects of the characters, such as fainting or breakage, was made possible.

(c) Color Fastness

After an area of each of the recording materials A, B and C, which had dimensions of 10 mm×30 mm, was painted in blue, the printed matters were left for 2 hours within a shaded tank in which ozone concentration was maintained to 30 ppm to accelerate color fading. The color difference (ΔE*ab) of the printed matters was measured (in conformity with JIS Z8730).

(d) Light Fastness

After an area of each of the recording materials A, B and C, which had dimensions of 10 mm×30 mm, was painted in blue, the printed matters were subjected to the light exposure test for 100 hours using Atlas xenon fadeometer Ci. The color difference (ΔE*ab) of the printed matters was measured. Table 2 shows the results of the measurements.

In items (c) and (d), 10 or less means that the color tone of the printed matter is not changed, and 20 or above indicates that the change in the color tone is great.

(e) Initial Density

After an area of each of the recording materials A and B, which had dimensions of 10 mm×30 mm, was painted in blue, density was measured using Macbeth RD 915. Table 2 shows the results of the measurements.

TABLE 2

| | Recipe | Dye (Central metal) | Evaluation | | | | |
|---|---|---|---|---|---|---|---|
| | | | a | b | c | d | e |
| Example 1 | 1 | 17 (Cu) | Non | 1 to 5 | 10 or less | 10 or less | 1.1 to 1.4 |
| Example 2 | 1 | 18 (Cu) | Non | 1 to 5 | 10 or less | 10 or less | 1.1 to 1.4 |
| Example 3 | 2 | 20 (Cu) | Non | 1 to 5 | 10 or less | 10 or less | 1.1 to 1.4 |
| Example 4 | 2 | 28 (Cu) | Non | 1 to 5 | 10 or less | 10 or less | 1.1 to 1.4 |
| Example 5 | 3 | 23 (Cu) | Non | 1 to 5 | 10 or less | 10 or less | 1.1 to 1.4 |
| Example 6 | 4 | 27 (Cu) | Non | 1 to 5 | 10 or less | 10 or less | 1.1 to 1.4 |
| Example 7 | 1 | 17 (Ni) | Non | 1 to 5 | 10 or less | 10 or less | 1.1 to 1.4 |
| Example 8 | 1 | 19 (Ni) | Non | 1 to 5 | 10 or less | 10 or less | 1.1 to 1.4 |
| Example 9 | 2 | 20 (Ni) | Non | 1 to 5 | 10 or less | 10 or less | 1.1 to 1.4 |
| Example 10 | 3 | 21 (Ni) | Non | 1 to 5 | 10 or less | 10 or less | 1.1 to 1.4 |
| Example 11 | 4 | 24 (Ni) | Non | 1 to 5 | 10 or less | 10 or less | 1.1 to 1.4 |
| Example 12 | 4 | 26 (Ni) | Non | 1 to 5 | 10 or less | 10 or less | 1.1 to 1.4 |
| Example 13 | 1 | 1 (Cu) | Non | 1 to 5 | 10 or less | 10 or less | 1.1 to 1.4 |
| Example 14 | 2 | 7 (Cu) | Non | 1 to 5 | 10 or less | 10 or less | 1.1 to 1.4 |
| Example 15 | 3 | 8 (Ni) | Non | 1 to 5 | 10 or less | 10 or less | 1.1 to 1.4 |
| Example 16 | 3 | 29 (Cu) | Non | 1 to 5 | 10 or less | 10 or less | 1.1 to 1.4 |
| Example 17 | 4 | 10 (Cu) | Non | 1 to 5 | 10 or less | 10 or less | 1.1 to 1.4 |
| Example 18 | 4 | 14 (Cu) | Non | 1 to 5 | 10 or less | 10 or less | 1.1 to 1.4 |
| Example 19 | 1 | 7 (Ni) | Non | 1 to 5 | 10 or less | 10 or less | 1.1 to 1.4 |
| Example 20 | 2 | 10 (Ni) | Non | 1 to 5 | 10 or less | 10 or less | 1.1 to 1.4 |
| Example 21 | 2 | 12 (Ni) | Non | 1 to 5 | 10 or less | 10 or less | 1.1 to 1.4 |
| Example 22 | 3 | 13 (Ni) | Non | 1 to 5 | 10 or less | 10 or less | 1.1 to 1.4 |
| Example 23 | 3 | 15 (Ni) | Non | 1 to 5 | 10 or less | 10 or less | 1.1 to 1.4 |
| Example 24 | 4 | 16 (Ni) | Non | 1 to 5 | 10 or less | 10 or less | 1.1 to 1.4 |
| Example 25 | 1 | 1 (Cu) | Non | 1 to 5 | 10 or less | 10 or less | 1.1 to 1.4 |
| Example 26 | 2 | 3 (Cu) | Non | 1 to 5 | 10 or less | 10 or less | 1.1 to 1.4 |
| Example 27 | 2 | 30 (Cu) | Non | 1 to 5 | 10 or less | 10 or less | 1.1 to 1.4 |
| Example 28 | 3 | 1 (Ni) | Non | 1 to 5 | 10 or less | 10 or less | 1.1 to 1.4 |
| Example 29 | 4 | 4 (Ni) | Non | 1 to 5 | 10 or less | 10 or less | 1.1 to 1.4 |
| Example 30 | 4 | 6 (Ni) | Non | 1 to 5 | 10 or less | 10 or less | 1.1 to 1.4 |
| Comparative Example 1 | 1 | C.I. Direct Blue 86 | Non | 1 to 5 | 25 to 35 | 10 or less | 1.6 to 1.8 |
| Comparative Example 2 | 3 | C.I. Direct Blue 199 | Non | 1 to 5 | 25 to 35 | 10 or less | 1.6 to 1.8 |
| Example 31 | 5 | 17 (Cu) | Non | 1 to 5 | 10 or less | 10 or less | 1.5 to 1.7 |
| Example 32 | 5 | 19 (Cu) | Non | 1 to 5 | 10 or less | 10 or less | 1.5 to 1.7 |
| Example 33 | 6 | 28 (Cu) | Non | 1 to 5 | 10 or less | 10 or less | 1.5 to 1.7 |
| Example 34 | 7 | 23 (Cu) | Non | 1 to 5 | 10 or less | 10 or less | 1.5 to 1.7 |
| Example 35 | 8 | 27 (Cu) | Non | 1 to 5 | 10 or less | 10 or less | 1.5 to 1.7 |
| Exaple 36 | 5 | 17 (Ni) | Non | 1 to 5 | 10 or less | 10 or less | 1.5 to 1.7 |
| Example 37 | 5 | 19 (Ni) | Non | 1 to 5 | 10 or less | 10 or less | 1.5 to 1.7 |
| Example 38 | 6 | 20 (Ni) | Non | 1 to 5 | 10 or less | 10 or less | 1.5 to 1.7 |
| Example 39 | 7 | 21 (Ni) | Non | 1 to 5 | 10 or less | 10 or less | 1.5 to 1.7 |
| Example 40 | 8 | 24 (Ni) | Non | 1 to 5 | 10 or less | 10 or less | 1.5 to 1.7 |
| Example 41 | 8 | 26 (Ni) | Non | 1 to 5 | 10 or less | 10 or less | 1.5 to 1.7 |
| Example 42 | 5 | 1 (Cu) | Non | 1 to 5 | 10 or less | 10 or less | 1.5 to 1.7 |
| Example 43 | 7 | 8 (Cu) | Non | 1 to 5 | 10 or less | 10 or less | 1.5 to 1.7 |
| Example 44 | 8 | 10 (Cu) | Non | 1 to 5 | 10 or less | 10 or less | 1.5 to 1.7 |
| Example 45 | 8 | 14 (Cu) | Non | 1 to 5 | 10 or less | 10 or less | 1.5 to 1.7 |
| Example 46 | 5 | 7 (Ni) | Non | 1 to 5 | 10 or less | 10 or less | 1.5 to 1.7 |
| Example 47 | 6 | 10 (Ni) | Non | 1 to 5 | 10 or less | 10 or less | 1.5 to 1.7 |
| Example 48 | 7 | 15 (Ni) | Non | 1 to 5 | 10 or less | 10 or less | 1.5 to 1.7 |
| Example 49 | 5 | 2 (Cu) | Non | 1 to 5 | 10 or less | 10 or less | 1.5 to 1.7 |
| Example 50 | 6 | 3 (Cu) | Non | 1 to 5 | 10 or less | 10 or less | 1.5 to 1.7 |
| Example 51 | 6 | 30 (Cu) | Non | 1 to 5 | 10 or less | 10 or less | 1.5 to 1.7 |
| Example 52 | 7 | 1 (Ni) | Non | 1 to 5 | 10 or less | 10 or less | 1.5 to 1.7 |
| Example 53 | 8 | 4 (Ni) | Non | 1 to 5 | 10 or less | 10 or less | 1.5 to 1.7 |
| Example 54 | 8 | 6 (Ni) | Non | 1 to 5 | 10 or less | 10 or less | 1.5 to 1.7 |
| Example 55 | 1 | 33 (Cu) | Non | 1 to 5 | 10 or less | 10 or less | 1.5 to 1.4 |
| Example 56 | 2 | 33 (Cu) | Non | 1 to 5 | 10 or less | 10 or less | 1.5 to 1.4 |
| Example 57 | 3 | 34 (Ni) | Non | 1 to 5 | 10 or less | 10 or less | 1.5 to 1.4 |
| Example 58 | 4 | 35 (Ni) | Non | 1 to 5 | 10 or less | 10 or less | 1.5 to 1.4 |
| Example 59 | 4 | 36 (Ni) | Non | 1 to 5 | 10 or less | 10 or less | 1.5 to 1.4 |

As will be understood from the foregoing description, it is possible according to the present invention to provide an ink which is capable of reducing generation of clogging and to form images whose color does not change readily.

What is claimed is:

1. An ink comprising a dye and a liquid carrier medium,
wherein the dye comprises a compound represented by the following general formula (I):

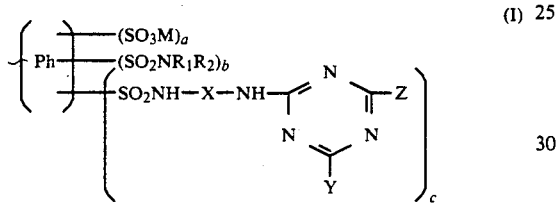
(I)

wherein Ph is a copper or nickel phthalocyanine residue, M is an alkali metal or ammonium, $R_1$ and $R_2$ are each H, $-(CH_2CH_2O)_m-R_3$ or $-(CH_2CHOH)_m-R_3$ in which $R_3$ is H, $CH_3$, $C_2H_5$ or $CH_2OH$ and in which m is a number from 0 to 4, a is a number from 0 to 2, X is a lower alkylene or phenylene group, C is a number from 2 to 3, and b is a number from 0 to 2 with the proviso that when b is 0, then Y and Z are respectively Cl, OH or $OR_4$ wherein $R_4$ is an alkyl group having 1 or 2 carbons or a hydroxyalkyl group, and when b is not 0, then Y is Cl, $NR_5R_6$ or $OR_7$ and Z is $NR_5R_6$, $OR_7$, a substituted or unsubstituted anilino group or a substituted or unsubstituted phenoxy group, wherein $R_5$ and $R_6$ are respectively H, an alkyl group, an alkylalkoxy group or a hydroxyalkyl group and have 4 or less carbons in total and, wherein $R_7$ is H, an alkyl group having 1 to 3 carbons or a substituted or unsubstituted phenyl group.

2. An ink according to claim 1, wherein said compound expressed by the general formula (I) is present in the ink in an amount from 0.1 to 20 percent by weight based on the total weight of the ink.

3. An ink according to claim 1, wherein said liquid carrier medium comprises a mixture of water and a water soluble organic solvent.

4. An ink according to claim 3, wherein said water soluble organic solvent comprises a polyhydric alcohol.

5. An ink according to claim 3, wherein said water soluble organic solvent is present in the ink in an amount from 2 to 80 percent by weight based on the total weight of the ink.

6. An ink comprising a dye and a liquid carrier medium,
wherein the dye comprises a compound represented by the following general formula (II):

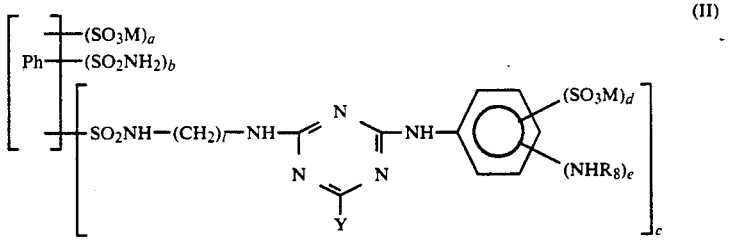
(II)

wherein Ph is a copper or nickel phthalocyanine residue, M is an alkali metal or ammonium, Y is Cl, $NR_5R_6$ or $OR_7$, $R_8$ is a substituted or unsubstituted triazine ring or a substituted or unsubstituted propionyl group, a is a number from 0 to 2, b is a number from 1 to 2, c is a number from 2 to 3, d is a number from 1 to 2, e is a number from 0 to 1, and l is a number from 1 to 3.

7. An ink according to claim 6, wherein said compound represented by the general formula (II) is present in the ink in an amount from 0.1 to 20 percent by weight based on the total weight of the ink.

8. An ink according to claim 6, wherein said liquid carrier medium comprises a mixture of water and a water soluble organic solvent.

9. An ink according to claim 8, wherein said water soluble organic solvent comprises a polyhydric alcohol.

10. An ink according to claim 8, wherein said water soluble organic solvent is present in the ink in an amount from 2 to 80 percent by weight based on the total weight of the ink.

11. An ink comprising a dye and a liquid carrier medium,
wherein the dye comprises a mixture of a compound represented by the following general formula (I) and C.I. Direct Blue 86 or C.I. Direct Blue 199 with a weight ratio of the compound of general formula (I) to said C.I. Direct Blue 86 or C.I. Direct Blue 199 ranging from 1:1 to 31:

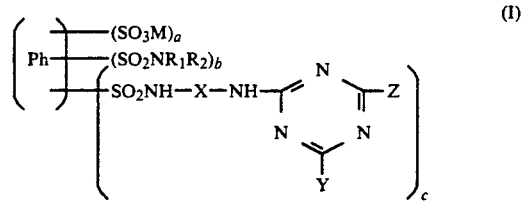
(I)

wherein Ph is a copper or nickel phthalocyanine residue, M is an alkali metal or ammonium, $R_1$ and $R_2$ are each H, $-(CH_2CH_2O)_m-R_3$ or $-(CH_2CHOH)_m-R_3$ in which $R_3$ is H, $CH_3$, $C_2H_5$ or $CH_2OH$ and in which m is a number from 0 to 4, a is a number from 0 to 2, X is a lower alkylene or phenylene group, C is a number from 2 to 3, and b is a number from 0 to 2 with the proviso that when b is 0, then Y and Z are respectively Cl, OH or $OR_4$ wherein $R_4$ is an alkyl group having 1 or 2 carbons or a hydroxyalkyl group, and when b is not 0, then Y is Cl, $NR_5R_6$ or $OR_7$ and Z is $NR_5R_6$, $OR_7$, a substituted or unsubstituted anilino group or a substituted or unsubstituted phenoxy group, wherein $R_5$ and $R_6$ are respectively H, an alkyl group, an alkylalkoxy group or a hydroxyalkyl group and have 4 or less carbons in total and,

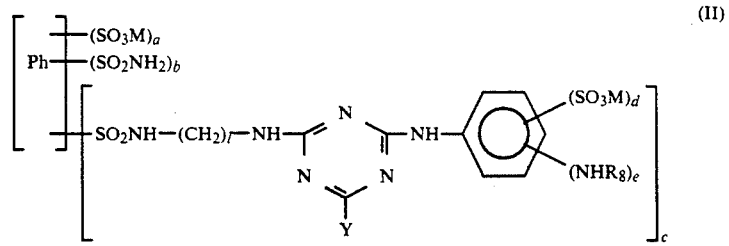

wherein $R_7$ is H, an alkyl group having 1 to 3 carbons or a substituted or unsubstituted phenyl group.

12. An ink according to claim 11, wherein said compound expressed by the general formula (I) is present in the ink in an amount from 0.1 to 20 percent by weight based on the total weight of the ink.

13. An ink according to claim 11, wherein said liquid carrier medium comprises a mixture of water and a water soluble organic solvent.

14. An ink according to claim 13, wherein said water soluble organic solvent comprises a polyhydric alcohol.

15. An ink according to claim 13, wherein said water soluble organic solvent is present in the ink in an amount from 2 to 80 percent by weight based on the total weight on the ink.

16. An ink comprising a dye and a liquid carrier medium,
wherein the dye comprises a mixture of a compound represented by the following general formula (II) and C.I. Direct Blue 86 or C.I. Direct Blue 199 with a weight ratio of the compound of general formula (II) to said C.I. Direct Blue 86 or C.I. Direct Blue 199 ranging from 1:1 to 3:1:

wherein Ph is a copper or nickel phthalocyanine residue, M is an alkali metal or ammonium, Y is Cl, $NR_5R_6$ or $OR_7$, $R_8$ is a substituted or unsubstituted triazine ring or a substituted or unsubstituted propionyl group, a is a number from 0 to 2, b is a number from 1 to 2, c is a number from 2 to 3, d is a number from 1 to 2, e is a number from 0 to 1, and l is a number from 1 to 3.

17. An ink according to claim 16, wherein said compound represented by the general formula (II) is present in the ink in an amount from 0.1 to 20 percent by weight based on the total weight of the ink.

18. An ink according to claim 16, wherein said liquid carrier medium comprises a mixture of water and a water soluble organic solvent.

19. An ink according to claim 18, wherein said water soluble organic solvent comprises a polyhydric alcohol.

20. An ink according to claim 18, wherein said water soluble organic solvent is present in the ink in an amount from 2 to 80 percent by weight based on the total weight of the ink.

* * * * *

UNITED STATES PATENT AND TRADEMARK OFFICE
CERTIFICATE OF CORRECTION

PATENT NO. : 5,123,960
DATED : June 23, 1992
INVENTOR(S) : Shirota et al.

It is certified that error appears in the above-identified patent and that said Letters Patent is hereby corrected as shown below:

<u>TITLE PAGE, [57] ABSTRACT:</u>

Line 12, "$OR_4$ is" should read --$OR_4$ wherein $R_4$ is--.

<u>COLUMN 4:</u>

Line 25, "heat" should read --head--;

Line 26, "an" should read --a--; and

Line 62, "dyes No. 1 to 31" should read --dyes No. 1 to 36--.

<u>COLUMN 20:</u>

Line 8, "-2-pyrolidone" should read -- -2-pyrrolidone --.

<u>COLUMN 23:</u>

Table 1, "N-methylpyrolidone" should read --N-methylpyrrolidone--.

<u>COLUMN 24:</u>

Table 1- continued, "N-methyl-2-pyrolidone" should read --N-methyl-2-pyrrolidone--.

UNITED STATES PATENT AND TRADEMARK OFFICE
CERTIFICATE OF CORRECTION

PATENT NO. : 5,123,960
DATED : June 23, 1992
INVENTOR(S) : Shirota et al.

It is certified that error appears in the above-identified patent and that said Letters Patent is hereby corrected as shown below:

COLUMN 26:

Table 2-continued, "Exaple 36" should read --Example 36--.

COLUMN 28:

Line 43, "31:" should read --3:1--.

COLUMN 29:

Line 30, "on" should read --of--.

Signed and Sealed this

Twelfth Day of October, 1993

BRUCE LEHMAN

Attest:

Attesting Officer

Commissioner of Patents and Trademarks